United States Patent [19]

Collins

[11] 3,751,878
[45] Aug. 14, 1973

[54] BULK SEPARATION OF CARBON DIOXIDE FROM NATURAL GAS

[75] Inventor: John Joseph Collins, Katonah, N.Y.
[73] Assignee: Union Carbide Corporation, New York, N.Y.
[22] Filed: Oct. 20, 1972
[21] Appl. No.: 299,461

Related U.S. Application Data

[63] Continuation-in-part of Ser. No. 187,162, Oct. 6, 1971.

[52] U.S. Cl................................ 55/58, 55/68, 55/75
[51] Int. Cl............................................. B01d 53/04
[58] Field of Search ...................... 58/58, 62, 68, 75, 58/179, 389

[56] References Cited
UNITED STATES PATENTS 3,266,221  8/1966  Avery ...................................... 55/68
3,226,913  1/1966  Avery ...................................... 55/75

Primary Examiner—Charles N. Hart
Attorney—Paul A. Rose, Richard G. Miller et al.

[57] ABSTRACT

In the bulk separation of carbon dioxide from feedstocks containing same in admixture with relatively non-sorbable gases using a zeolitic molecular sieve to adsorb selectively the carbon dioxide, higher product purity is attained by terminating the adsorption stroke using the feedstock while the bed still has capacity to adsorb more carbon dioxide at the same conditions, then purging the void space hydrocarbons from the bed using product carbon dioxide at a high partial pressure, and finally desorbing the bed by pressure reduction.

3 Claims, 1 Drawing Figure

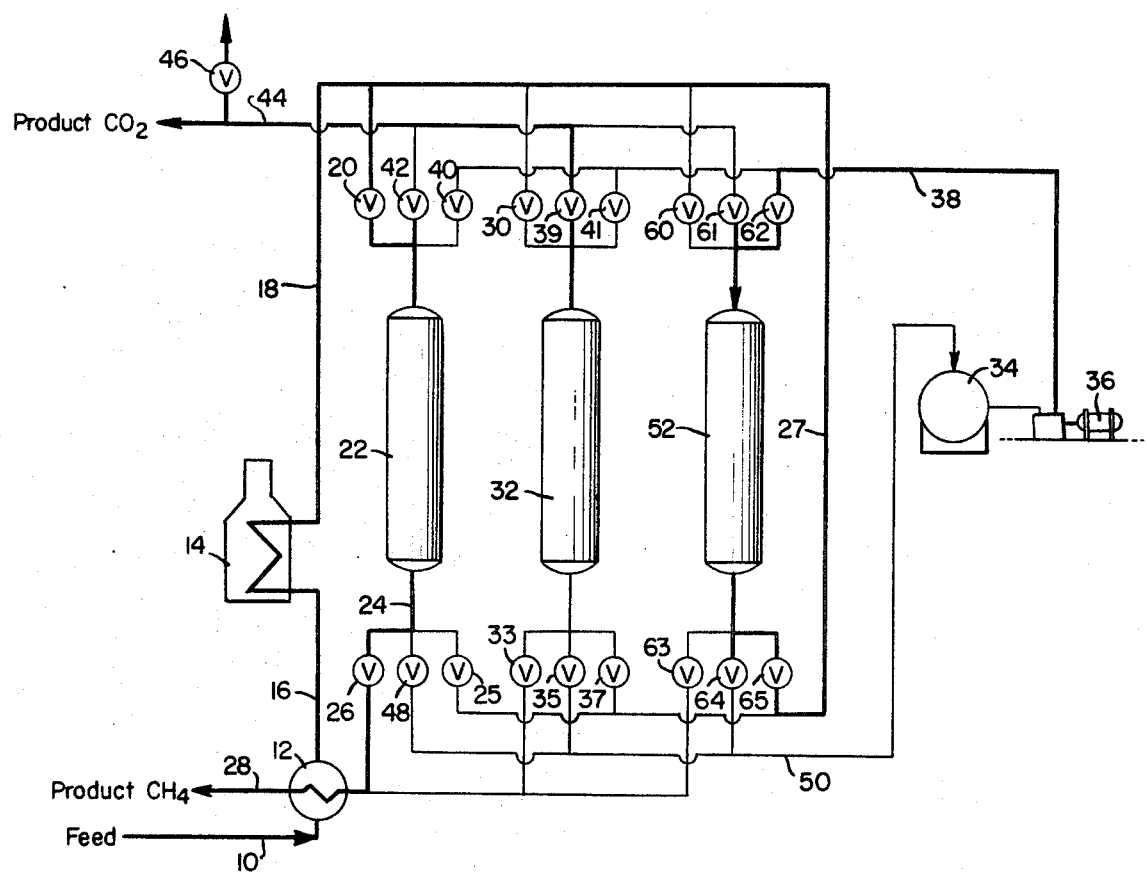

BULK SEPARATION OF CARBON DIOXIDE FROM NATURAL GAS

RELATED APPLICATIONS

This is a continuation-in-part application of copending U.S. Application Ser. No. 187,162 filed Oct. 6, 1971.

The present invention relates, in general, to a process for separating carbon dioxide from gas mixtures, and more particularly to a process for selectively adsorbing carbon dioxide on a zeolitic molecular sieve from admixture with other gaseous constituents which are relatively non-adsorbed. Specific embodiments of the process include the bulk separation of carbon dioxide from lean natural gas streams and from synthetic natural gas streams.

The bulk separation of carbon dioxide from low grade natural gas is desirable both economically and ecologically. Although carbon dioxide is almost always present in natural gas at the well head, the relative concentration levels vary greatly from as little as trace amounts to more than 50 mole per cent.

Similarly in the synthesis of methane by means of coal gasification it is advantageous to reduce the carbon dioxide content of the gas stream from the shift converter prior to its being passed to the methanation reactor. Such gas streams typically contain as much as 30 mole per cent carbon dioxide.

It has heretofore been proposed to remove carbon dioxide from methane-containing gas streams using selective adsorption on zeolitic molecular sieves. These proposals, in the main, concern gas streams containing relatively low, i.e., less than about 7 mole per cent, carbon dioxide concentrations. In these concentrations, the carbon dioxide can be considered as a mere impurity or contaminant. It is not feasible, however, to use such process cycles when the carbon dioxide constitutes a higher proportion of the gas stream. In these circumstances physical adsorption or selective dissolution of the carbon dioxide in organic compositions such as α-methylpyrrolidone is currently in commercial usage.

It has now been discovered, however, that a highly efficient bulk separation of carbon dioxide from natural gas or other gas streams comprising methane and carbon dioxide can be accomplished using molecular sieve adsorbents.

The process of this invention which enables the aforesaid accomplishment comprises passing, at a temperature of from 150° F to 900° F and at a pressure of from 100 to 2,000 psia, a gaseous feedstock comprising a mixture of carbon dioxide and methane containing from 10 to 75 mole per cent carbon dioxide into an adsorption bed containing a zeolitic molecular sieve adsorbent having a pore diameter large enough to adsorb $CO_2$, thereby selectively adsorbing $CO_2$ and recovering methane and any other non-sorbable gas components present as an effluent stream, said feedstock being passed into said adsorption bed for a time not greater than that which results in exceeding the further capacity of the bed at the same conditions to adsorb at least some, and preferably all, of the carbon dioxide in the void space of said bed, terminating the flow of the said feedstock into the bed, and cocurrently passing a stream consisting essentially of carbon dioxide thereinto, said stream having a carbon dioxide partial pressure at least 0.8 as great as the partial pressure of carbon dioxide in the said feedstock, in an amount sufficient to purge substantially all of the non-adsorbable gases from the void space of the bed, and thereafter withdrawing at least a portion of the carbon dioxide from said bed by adiabatically reducing the pressure thereon. As used hereinafter and in the claims the term "bed void space" is intended to include adsorber head space voids as well as all intercrystalline voids.

The gas stream advantageously treated in the present process contain from about 10 to about 75 mole per cent carbon dioxide. In the case of natural gas, the other principal constituent is usually methane. In the case of gas streams originating in the synthesis of natural gas, the methane content can be very small in which event the principal non-sorbable gases in admixture with carbon dioxide are hydrogen and carbon monoxide. In any gas stream treated in accordance with the present invention, strongly adsorbed compounds such as water, hydrogen sulfide and lower mercaptans should not be present in proportions greater than about 25 volume per cent of the carbon dioxide of the feed. During the adsorption stroke in which the gas feedstock is being passed into an adsorption bed, these strongly adsorbed compounds are retained on the inlet end section of the bed. Operation of the overall process in a manner such that these impurities are periodically desorbed and removed from the adsorption bed is advantageous practice. Relatively non-condensible hydrocarbons such as ethane and propane and also the higher condensible hydrocarbons are frequently present in natural gas, but if present, need not be removed from the feedstocks in the present process. It is preferred, however, that when treating feedstocks containing greater than about 0.5 volume per cent total $C_4$ and/or higher hydrocarbons, a zeolite adsorbent should be employed which excludes butane and higher hydrocarbons on the basis of size, i.e., the adsorbent pore size should be about 4 angstroms.

In general, considering the foregoing, the pore size of the adsorbent is not critical and, hence, a wide variety of synthetic or natural crystalline zeolitic molecular sieves are available for use in this process as well as silica gel and activated carbon. These include zeolites A, T, K-G, W, R, D, L, X, Y, S and Z as identified more particularly in U. S. Pat. No. 3,176,445, issued Apr. 6, 1965 to J. J. Collins et al. and the references cited therein. Synthetic and naturally occurring mordenites are also suitable.

The process is illustrated by the following description in conjunction with the drawing which is a schematic flow diagram using a three-bed adsorption system for continuous operation. It will, of course, be readily apparent to those skilled in the art that a system comprising one, two or "n" beds can be utilized if desired without departure from the present invention.

In the illustrative process, the feedstock being treated is a natural gas from the well head having the following composition:

| Constituent | Presence, Mol.% |
|---|---|
| Carbon dioxide | 52.61 |
| Nitrogen | 0.41 |
| Methane | 46.63 |
| Ethane | 0.32 |
| Propane | 0.02 |
| i-Butane | 0.01 |
| Water Vapor | saturated at 90°F 1,000 psia |

The feed at 1,000 psia and 90° F enters the system through line 10 and is heated to 300° F, first by heat-exchanging with product methane leaving the system through heat exchanger 12 and thereafter by passage through furnace 14 via line 16. From furnace 14 the heated gas stream passes through line 18 and valve 20 into adsorption bed 22 which is charged with sodium zeolite X-pellets. As the adsorption stroke in bed 22 continues, an adsorption front for $CO_2$ forms and advances toward the bottom or egress end of the bed. Non-adsorbed methane, nitrogen and other hydrocarbons leave the bed through line 24, valve 26 and heat exchanger 12, and line 28 as product natural hydrocarbon gas. The adsorption stroke in bed 22 is terminated prior to or just at the point in time when there remains sufficient bed capacity, in the unused or egress end of the bed, to adsorb the carbon dioxide present in the bed void spaces, i.e., the interstitial spaces between the adsorbent pellets upstream from the carbon dioxide mass transfer zone. In general, the adsorption stroke will be continued until the carbon dioxide adsorption zone has traveled between about 60 and 90 per cent of the length of the bed. To terminate the adsorption stroke in bed 22, valve 20 is closed and the feed is directed from line 18 through valve 30 into adsorption bed 30 wherein a new adsorption stroke is begun in that bed. At this point, the pressure in bed 22 can either be maintained, or cocurrently depressurized to any pressure not less than 0.8 times the partial pressure of $CO_2$ in the feedstock. If depressurization is desired, it is accomplished by allowing non-sorbed compounds or elements in bed 22 to pass through valve 26, heat exchanger 12 and line 28 in the requisite amount. In either event, a purge stream of substantially pure previously isolated carbon dioxide is passed from storage container 34 through compressor 36, line 38 and valve 40 cocurrently into bed 22 for a period of time sufficient to purge the void space hydrocarbons and nitrogen through line 24, valve 26, heat exchanger 12 and line 28, and to adsorb the carbon dioxide present in the void space at the termination of the adsorption stroke. The use of the carbon dioxide purge serves another significant function in addition to removing void space hydrocarbon from the bed. Although, in general terms methane can be considered a non-sorbable gas, particularly by comparison with carbon dioxide, nevertheless there is a finite degree of co-adsorption of methane and carbon dioxide on the molecular sieve. Among other factors the relative quantity of these co-adsorbed materials is a function of their relative concentrations in the environment of a given zeolite crystal. By utilizing a carbon dioxide purge stream at pressures as high or higher than the $CO_2$ pressure in the adsorption bed during the adsorption stroke, the partial pressure of carbon dioxide, i.e., its concentration over the zeolite cyrstals is increased resulting in some displacement of adsorbed methane by newly adsorbed carbon dioxide. The displaced methane is then void space methane and is forced from the bed by the purging action of the carbon dioxide stream. So long as the partial pressure of carbon dioxide in the purge stream is greater than that of the carbon dioxide in the feedstock being treated, an advantage in increased purity of the products will be obtained with the advantage being proportioned to the difference in the partial pressure values. Another technique which can be used to insure maximum purity of the product hydrocarbon is the withdrawal of void space hydrocarbon from bed 22 during the carbon dioxide purge step through valve 25, line 27 and passing it in admixture with feedstock from line 18 through valve 30 into adsorption bed 32 on which is on an adsorption stroke during the carbon dioxide purge step in bed 22. Thereafter, the carbon dioxide adsorbed in bed 22 as well as that in the void spaces thereof are partially removed by depressurization of bed 22 cocurrently and counter-currently. The counter-current depressurization is accomplished by opening valve 42 to release carbon dioxide from the system through line 44. If desired, to improve the purity of the product carbon dioxide, the initial effluent from bed 22 into line 44 can be discarded since it will contain strongly adsorbed impurities from the well head feedstock, such as water and $H_2S$, which have been adsorbed at the egress end of the bed during the adsorption stroke. This initial impure carbon dioxide is taken from the system through valve 46. The cocurrent depressurization of bed 22 is accomplished through line 24, valve 48 and line 50 to the extent necessary to replenish to storage container 34 the amount of carbon dioxide used to purge the void space non-adsorbables from bed 22 in the previous step of the process. Ordinarily, the pressure-swing desorption is terminated when the bed pressure has been reduced to atmospheric pressure, but termination at higher pressures or the use of vacuum to obtain subatmospheric pressures can be practiced. The optimum termination point will depend upon such factors as bed design, type of zeolite adsorbent employed, the initial temperature and pressure of the bed, and the like. After the desorption-depressurization step, the bed 22 is repressurized to 1,000 psia using feed from line 18 through valve 20 and is ready for a new separation cycle.

The adsorption systems represented by beds 22, 32 and 52 together with their valves and conduits are identical and operate in a phased relationship which allows 4 minutes for the adsorption step, 2.5 minutes for the carbon dioxide purge step, 3 minutes for pressure-swing desorption and 2.5 minutes for repressurization in each adsorption bed. This relationship is shown graphically below wherein A represents adsorption, P represents purging with $CO_2$, D represents depressurization with desorption and R represents repressurization.

| Time, min | 1 | 2 | 3 | 4 | 5 | 6 | 7 | 8 | 9 | 10 | 11 | 12 |
|---|---|---|---|---|---|---|---|---|---|---|---|---|
| Bed: | | | | | | | | | | | | |
| 22 | A | | | | P | | | D | | | R | |
| 32 | D | | R | | A | | | | P | | | D | |
| 52 | P | | | D | | R | | | A | | | | |

Thus, over the period of time bed 22 is on an adsorption stroke, bed 32 undergoes the final portion of the desorption of carbon dioxide through valve 39 into line 44 and valve 35 into line 50 and is repressurized to 1,000 psia by feed flowing thereinto from line 18 through valve 30. Also, during the adsorption stroke in bed 22, the carbon dioxide purge step accomplished in bed 52 with the void space hydrocarbon being removed from the system through valve 63, heat exchanger 12 and line 28 or optionally is being recycled to bed 22 through valve 65, line 27 and valve 20, and a part of the pressure-swing desorption of bed 52 is also accomplished. For this step valves 64 and 61 are used in the manner in which valves 42 and 48 are employed in the desorption of bed 22. Valves 60, 61, 62, 63, 64 and 65 of bed 52, and valves 30, 39, 41, 33, 35 and 37 of bed 32 and valves 20, 42, 40, 26, 48 and 25 of bed 22 respectively in the order given, are operated in the same manner during the corresponding process step in the appropriate time interval to achieve the integrated process shown graphically, supra.

It will be obvious to those skilled in the art that numerous modifications can be made in the basic process of this invention by the application of routine skills. For example, the number of adsorption beds employed can be increased to the extent that the carbon dioxide storage container, shown in the drawing as 34, can be dispensed with due to the fact that during the carbon dioxide purge in one bed, there is always another bed in the system being desorbed to provide the carbon dioxide required. Another modification which avoids the use of a carbon dioxide storage container 34 and valves 48, 35 and 64 is the use of a portion of the product carbon dioxide from line 44, at appropriately increased pressure, to supply purge gas to manifold 38 as required.

Since at the end of the desorption-depressurization step in any of the beds, e.g. bed 22, the bed will contain carbon dioxide in a more or less uniform concentration throughout. Accordingly, upon the beginning of a new cocurrent adsorption stroke, some carbon dioxide will be forced from the effluent end of the bed. This carbon dioxide would then be an impurity in the methane product. To eliminate this source of contamination, the bed can be repressurized prior to beginning the adsorption stroke counter-currentlY with product methane. This has the effect of purging adsorbed carbon dioxide from the effluent end of the bed (with respect to the adsorption stroke) and redepositing it upward in the bed, thus inhibiting premature breakthrough of carbon dioxide during the adsorption stroke.

In essentially the same manner as illustrated above using a typical natural gas feedstock, carbon dioxide can be removed from an intermediate gas stream in a natural gas synthesis process. Such a gas stream is typified by the following composition in terms of mole fractions:

| | |
|---|---|
| $CH_4$ | 0.14 |
| CO | 0.125 |
| $CO_2$ | 0.281 |
| $H_2$ | 0.380 |
| $H_2O$ | 0.064 |
| $H_2S$ | 0.002 |
| Misc. | 0.010 |

Using this gas mixture in the present process one of the separated products will be carbon dioxide and the other will be a mixture of methane, hydrogen, and carbon monoxide.

What is claimed is:

1. Process which comprises passing at a temperature of from 150° F to 900° F and at a pressure of from 100 to 2,000 psia, a gaseous feedstock comprising a mixture of carbon dioxide and at least one non-sorbable gas selected from the group consisting of methane, hydrogen and carbon monoxide, said feedstock containing from 10 to 75 mole per cent carbon dioxide, into an adsorption bed containing a zeolitic molecular sieve adsorbent having a pore diameter large enough to adsorb $CO_2$ to selectively adsorb $CO_2$ and recover the non-sorbable gas as an effluent stream, said feedstock being passed into said adsorption bed for a time not greater than that which results in exceeding the further capacity of the bed at the same conditions to adsorb at least some of the carbon dioxide in the void space of said bed, terminating the flow of the said feedstock into the bed, and concurrently passing a stream consisting essentially of carbon dioxide thereinto, said stream having a carbon dioxide partial pressure at least 0.8 as great as the partial pressure of carbon dioxide in the said feedstock, in an amount sufficient to purge substantially all of the non-sorbable gas from the void space of the bed, and thereafter withdrawing at least a portion of the carbon dioxide from said bed by adiabatically reducing the pressure thereon.

2. Process for bulk separation of carbon dioxide from admixture with methane which comprises passing at a temperature of from 150° F to 900° F and at a pressure of from 100 to 2,000 psia, a gaseous feedstock comprising a mixture of carbon dioxide and methane containing from 10 to 75 mole per cent carbon dioxide into an adsorption bed containing a zeolitic molecular sieve adsorbent having a pore diameter large enough to adsorb $CO_2$ to selectively adsorb $CO_2$ and recover methane as an effluent stream, said feedstock being passed into said adsorption bed for a time not greater than that which results in exceeding the further capacity of the bed at the same conditions to adsorb at least some of the carbon dioxide in the void space of said bed, terminating the flow of the said feedstock into the bed, and cocurrently passing a stream consisting essentially of carbon dioxide thereinto, said stream having a carbon dioxide partial pressure at least 0.8 as great as the partial pressure of carbon dioxide in the said feedstock, in an amount sufficient to purge substantially all of the methane from the void space of the bed, and thereafter withdrawing at least a portion of the carbon dioxide from said bed by adiabatically reducing the pressure thereon.

3. Process according to claim 2 wherein the feedstock is passed into the adsorption bed for a time not greater than that which results in exceeding the further capacity of the bed at the same conditions to adsorb all of the carbon dioxide in the void space of said adsorption bed.

* * * * *